(12) United States Patent
Sartin

(10) Patent No.: US 7,409,485 B1
(45) Date of Patent: Aug. 5, 2008

(54) OPTIMIZED DATA TRANSFER FOR A DATA BUS

(75) Inventor: Mickey D. Sartin, Apex, NC (US)

(73) Assignee: Cisco Technology, Inc., San Jose, CA (US)

( * ) Notice: Subject to any disclaimer, the term of this patent is extended or adjusted under 35 U.S.C. 154(b) by 188 days.

(21) Appl. No.: 11/262,186

(22) Filed: Oct. 27, 2005

(51) Int. Cl.
*G06F 13/42* (2006.01)
*G06F 13/00* (2006.01)
*G06F 13/14* (2006.01)

(52) U.S. Cl. .................. 710/305; 710/34; 710/106
(58) Field of Classification Search .......... 710/34, 710/106, 305
See application file for complete search history.

(56) References Cited

U.S. PATENT DOCUMENTS

| | | | |
|---|---|---|---|
| 5,978,858 A | 11/1999 | Bonola et al. | |
| 6,021,129 A * | 2/2000 | Martin et al. | 370/395.72 |
| 6,061,687 A | 5/2000 | Wooten | |
| 6,128,673 A | 10/2000 | Aronson et al. | |
| 6,311,294 B1 * | 10/2001 | Larky et al. | 714/44 |
| 6,505,267 B2 * | 1/2003 | Luke et al. | 710/315 |
| 6,523,081 B1 | 2/2003 | Karlsson et al. | |
| 6,742,076 B2 * | 5/2004 | Wang et al. | 710/314 |
| 6,842,797 B1 * | 1/2005 | Lawande | 710/35 |
| 7,058,747 B2 * | 6/2006 | Chang et al. | 710/305 |
| 7,281,074 B2 * | 10/2007 | Diefenbaugh et al. | 710/260 |
| 2003/0079061 A1 | 4/2003 | Azzarito et al. | |
| 2007/0005859 A1 * | 1/2007 | Diefenbaugh et al. | 710/260 |
| 2007/0022204 A1 * | 1/2007 | Moch et al. | 709/230 |

OTHER PUBLICATIONS

Compaq et al.; "Universal Serial Bus Specification"; Apr. 27, 2000; Revision 2.0; p. 82.*

* cited by examiner

*Primary Examiner*—Paul R. Myers
*Assistant Examiner*—Ryan M Stiglic
(74) *Attorney, Agent, or Firm*—MacPherson Kwok & Chen & Heid LLP

(57) ABSTRACT

A communications system is provided in which a host may receive data from a slave device over a polling bus. The slave device first reports to the host an initial amount of data to be transferred. The host can then initiate a data transfer from the slave device in order to retrieve the specified amount of data. As that initial data is being transferred over the bus, if additional data to be transferred to the host is received by the slave device, the slave device will report that supplemental amount of data to the host along with the initial data. The host may then immediately schedule a supplemental data transfer from the slave device in order to retrieve the additional data. The slave device may utilize a self-decrementing counter in order to keep track of the packets that require transfer but have not yet been reported to the host. The amount of data reported by the slave device to the host device may be provided as a count of packets in which the packets have a predetermined maximum size.

30 Claims, 4 Drawing Sheets

OPTIMIZED DATA TRANSFER FOR A DATA BUS

BACKGROUND

The Universal Serial Bus (USB) is a serial interface standard developed to provide flexible interconnections between a host device and multiple USB functions. A USB function is contained within a device and provides a capability to the host, such as a digital microphone, speakers, a mouse, a keyboard, camera, game controller, flash drive or a network adapter. USB utilizes a master-slave architecture in which the USB host, as master, initiates all data transfers with USB functions, as slaves, both into and out of the host device. The USB architecture does not provide a mechanism for attached functions to arbitrate for use of the bus. Thus, the USB host is responsible for providing the arbitration service to attached functions. This is typically accomplished by polling the attached functions on a periodic schedule to determine whether each function has data to transfer to the host and subsequently scheduling the data transfer.

The USB architecture supports functional data and control exchange between the USB host and a USB device as a set of either uni-directional or bi-directional pipes. USB data transfers take place between host software and a particular endpoint on a USB device. Such associations between the host software and a USB device endpoint are called pipes.

The USB architecture provides four basic types of data transfers. Control transfers are used to configure a device at attach time and can be used for other device-specific purposes, including control of other pipes on the device or host access to control registers on the device. Bulk data transfers are utilized for variably sized and bursty transfers and have wide latitude in usage. Exemplary usage would be in devices that are used by a computer file system such as flash drives, thumb drives, or the other common names for mass storage USB interfaces. Interrupt data transfers are typically used for regularly scheduled delivery of data, for example, polling a USB mouse for movement or a USB keyboard for new input. Isochronous data transfers occupy a prenegotiated amount of USB bandwidth with a prenegotiated delivery latency. Isochronous data transfer are sometimes referred to as streaming real time transfers. Exemplary usage would be a USB base audio device which steadily receives audio to be played through the speakers and steadily transmits audio from a microphone. A single pipe supports only one of the types of transfers described above for any given device configuration.

One common application of USB is the use of a USB network adapter (Ethernet, WiFi, Phoneline, Powerline) for providing network connectivity to a personal computer via a USB port. Exemplary USB network adapters include the WUSB54GP Wireless-G Portable USB Adapter V4.0, the WUSB54GS Wireless-G USB Network Adapter with Speedbooster, and the WUSB54G Wireless-G USB Network Adapter V4.0, all from the Linksys division of Cisco Systems, Inc., of San Jose, Calif. However, typical USB network adapters can consume excessive bandwidth in the polling mechanism utilized for supporting packet reception. This polling mechanism involves the generation of continuous bulk-IN data transfers to poll for packet reception. For each bulk-IN data transfer process, the USB driver on the host generates a bulk-IN transfer descriptor and stores the transfer descriptor in queue. The USB host controller fetches the transfer descriptor from queue and transmits a bulk-IN token to the USB network adapter. This bulk-IN token describes the type and direction of data transfer (e.g., bulk-IN), the USB device address, and the endpoint number.

When the USB network adapter receives the bulk-IN token from the USB host, if no new network data has been received by the adapter, the adapter will respond to the bulk-IN token with a NAK handshake packet. The USB host will continuously transmit bulk-IN tokens to the USB network adapter until the USB network adapter receives network data, in which case the USB network adapter will respond to the bulk-IN token with a bulk data packet containing the network data.

Polling using the bulk-IN transfer enables reception of the data with minimal latency. However, the repeated generation of bulk-IN transfer descriptors by the USB host, even when no new network data has been received, can consume an excessive amount of host resources. In some cases, the continuous bulk-IN tokens and NAK responses may consume up to approximately 50% of the total USB bandwidth. The extra bandwidth consumed on the host side can measurably slow other transfers to/from other USB endpoints on the bus. In addition, the polling mechanism can consume transfer resources in the host computer for an indeterminate period of time. The overhead imposed by this polling mechanism decreases overall throughput on the USB bus and increases the chance that that other USB devices on the bus will operate inefficiently or even improperly.

Accordingly, there is a need for an interface providing improved data transfer between a host and a peripheral over a bus. It is desirable that the interface provide minimal data transfer latency, while not consuming an excessive amount of host resources.

DETAILED DESCRIPTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

In accordance with embodiments of the present invention, a communications system is provided in which a host may receive data from a slave device over a polling bus. The slave device first reports to the host an initial amount of data to be transferred. The host can then initiate a data transfer from the slave device in order to retrieve the specified amount of data. As that initial data is being transferred over the bus, if additional data to be transferred to the host is received by the slave device, the slave device will report that supplemental amount of data to the host along with the initial data. The host may then immediately schedule a supplemental data transfer from the slave device in order to retrieve the additional data. The slave device may utilize a self-decrementing counter in order to keep track of the packets that require transfer but have not yet been reported to the host. The amount of data reported by the slave device to the host device may be provided as a count of packets in which the packets have a predetermined maximum size. The term "packets" as used herein refers to any datagram, including packets, frames, and cells.

In one embodiment, the communications system comprises a host computer and a USB network adapter. The network adapter receives data over a network connection and passes that data on to the host computer via the USB bus. The data transfer from the network adapter to the host computer may be performed using a bulk-IN data transfer process. The reporting of the supplemental amount of data may be performed by appending the supplemental amount of data to the bulk-IN data payload containing the initial data. In some cases, in order to reduce the host resources consumed by the polling process, the initial reporting by the network adapter of the initial amount of data to be transferred may occur in response to an interrupt poll. After the host is informed of the presence of data to be retrieved, the host will initial a bulk-IN data transfer. In other embodiments, the host may poll the network adapter using a bulk-IN poll.

Figure 1:
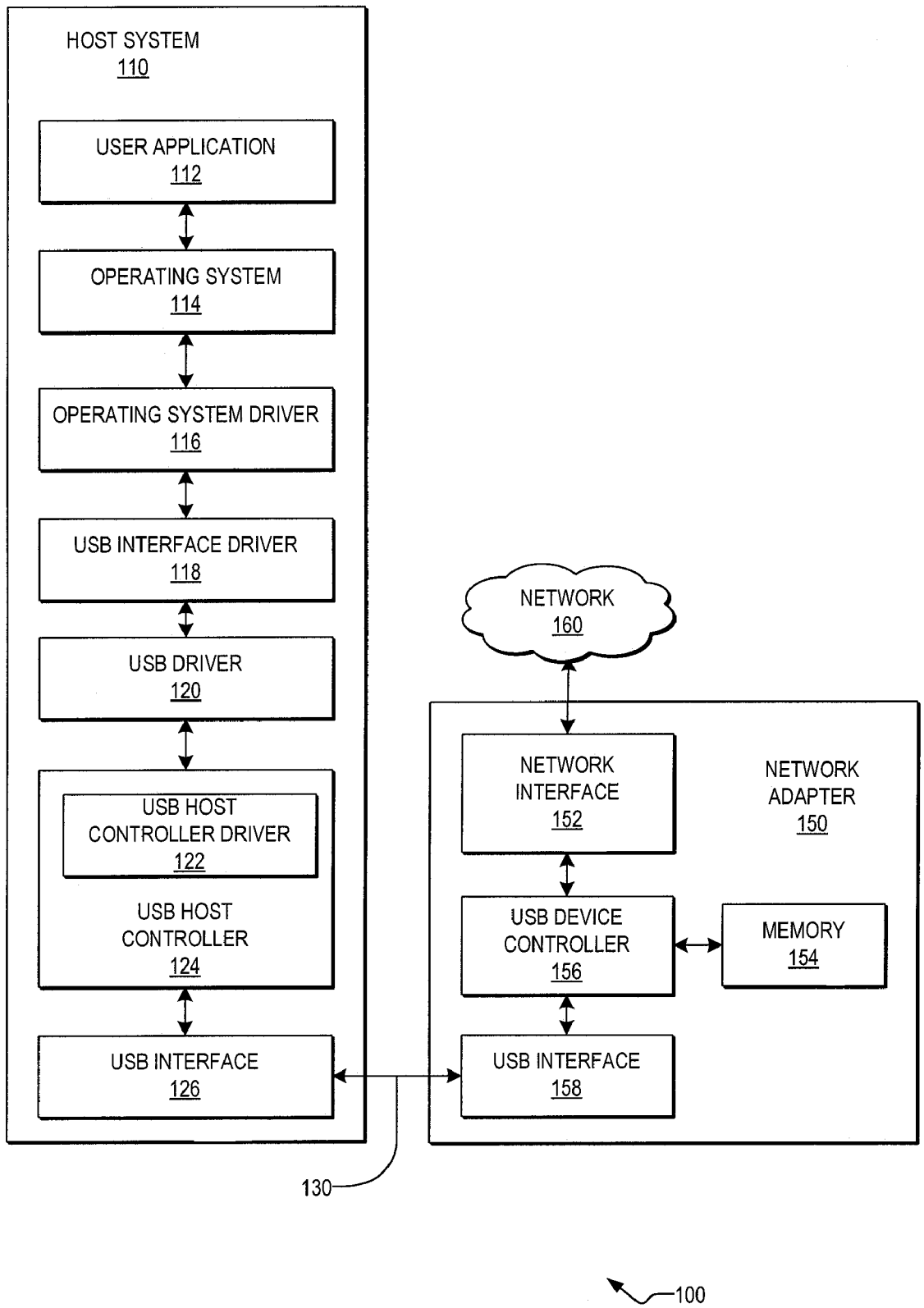
FIG. 1 is a block diagram showing an exemplary data communications system, in accordance with embodiments of the present invention.

FIG. 1 is a simplified block diagram showing an exemplary data communications system 100, in accordance with embodiments of the present invention. The system 100 comprises a host system 110 coupled to a USB network adapter 150 via a USB cable 130. The network adapter 150 provides the host system 110 with connectivity to a network 160, which can be, e.g., a local area network. It will be understood that FIG. 1 is a generalized illustration and that other components are present or some components may be merged, as would be understood by one of ordinary skill in the art The host system 110 may comprise any computing device configured to operate as the USB host, including, e.g., a workstation, a personal computer, a laptop computer, a personal digital assistant, a digital camera, or the like. The host system 110 comprises a USB interface 126 for coupling with the USB cable 130, a USB host controller 124, one or more USB drivers 120, a USB interface driver 118, an operating system driver 116, an operating system 114, and a user application 112. The host system 110 manages the USB bus and operates in a master/slave relationship with each of the functions on the bus, where the host serves as the master and each of the functions serves as a slave.

The host controller 124 comprises USB host hardware and software, including the Host Controller Driver (HCD) 122, which manages the bus and initiates all data transfers. The hardware portion of the host controller 124 may comprise a USB 2.0 controller such as the Philips 1561, and the HCD 122 may comprise an EHCI/OHCI (Enhanced Host Controller Interface/Open Host Controller Interface) driver.

The USB driver 120, which is typically implemented as software, is utilized by the USB Interface software 118 for controlling the communications with the USB function (e.g., the USB network adapter 150).

The USB Interface software 118 interacts with the USB driver 120 to arrange data transfer between the function (e.g., network adapter 150) and the host system 110. The client software 118 is typically the data provider and consumer for the transferred data associated with the function driven by the client software 118. In the system 100 shown in FIG. 1, the client software 118 comprises the network interface driver.

The operating system driver 116 may comprise TCP/IP, the operating system 114 may comprise Microsoft Windows, and the user application 112 may comprise Internet Explorer.

The network adapter 150 comprises a network interface 152, a memory 154, a USB device controller 156, and a USB interface 158. The network interface 152 can be, e.g., an Ethernet interface for connection with an Ethernet network 160, an 802.11a/b/g network, or any other physical network option.

In accordance with embodiments of the present invention, the USB driver 120 periodically polls the network adapter 150 using an interrupt transfer (INT) in order to check whether the network adapter 150 has received any additional data packets from the network 160 that the host system 110 has not been made aware of. The INT poll can be scheduled in a hardware register in order to minimize host and bus overhead. The frequency of polling may vary. It would generally be desirable to increase the frequency on faster network interfaces in order to maximize the performance of the network adapter 150. The polling may occur at the same rate that frames can be received over the bus, e.g., for a full speed USB 1.1 bus, an INT poll may be generated every millisecond. Alternatively if the network interface is relatively slow, such as a cellular GPRS connection, then the frequency may be decreased in order to further reduce USB bus overhead.

The USB device controller 156 of the network adapter 150 is configured to store in the memory 154 a count of data packets received from the network 160. As each new packet is received from the network 160 via the network interface 152 and stored in a buffer, the controller 156 increments the counter by one. The counter may be implemented in a variety of ways, such as, e.g., a hardware register in the network adapter 150 or it could be managed by the software/firmware as a variable in memory 154. Each time the value of the counter is transmitted to the host via the INT poll or as supplemental data to the BULK_IN transfer, the counter is decremented by the number reported. This ensures that the host will not schedule more than one transfer for the same network packet.

Each time an interrupt poll is received by the USB device controller 156, the controller 156 will check the counter to determine whether any packets are awaiting delivery to the host system 110. If the counter indicates that no packets are awaiting delivery (e.g., the counter=0), then the controller 156 will respond to the interrupt channel poll with a negative acknowledgement handshake packet (NAK). If the counter indicates that one or more packets have been received and are awaiting delivery (e.g., the counter>0), the controller 156 will respond to the interrupt poll with a data payload indicating the presence of packets. This interrupt data payload may merely indicate that a packet is available, or, more preferably, the data payload may contain a precise count of the number of packets that are available. After reporting the count of packets to the host system 110, the controller 156 will decrement the counter by that count value.

When the USB driver 120 receives the interrupt process data payload indicating the presence of packets received by the network adapter 150, the USB driver 120 will initiate one or more bulk transfer processes in order to retrieve the waiting packets. If the interrupt data payload provided a precise count of packets to be transferred, the USB driver 120 will queue a sufficient number of bulk transfer processes to retrieve all of the packets. Thus, the interrupt polling is used only to trigger the start of the data transfers and to provide the host system 110 with information regarding the count of data packets so that the host system 110 will not schedule more bulk transfer processes than necessary.

In other embodiments, the controller 156 will not provide the host system 110 with the count of waiting data packets. Instead, the interrupt response will only indicate that at least one data packet is waiting. In this case, the USB driver 120 may continue to initiate bulk transfer processes with the network adapter endpoint until the controller 156 responds with a NAK to indicate that no additional packets are available. After a NAK response is received or a the host times out waiting for a response, the USB driver 120 will return to scheduling periodic interrupt polls as described above. Alternatively, the USB driver 120 may schedule a single bulk transfer process to retrieve the data.

In some embodiments, the type of information provided by the network adapter's response to the interrupt poll may be selectable. For example, the host system 110 may provide a device specific option register for indicating whether the packet count information should be provided in the response. The controller 156 can be informed of this selection during the initial enumeration process.

As the controller 156 begins to transfer the waiting packets to the host system 110 via the bulk transfer process(es), the network adapter 150 may continue to receive additional data packets over the network interface 152. Each time an additional data packet is received, the counter is incremented accordingly. The network adapter 150 can inform the host system 110 of the presence of additional data packets by appending a supplemental count of additional data to the data payload for one of the pending bulk transfer processes. After this supplemental count is reported to the host system 110, the controller 156 may again decrement the counter by the supplement count.

When the USB driver 120 receives this supplemental count information, the USB driver 120 can schedule additional bulk transfer processes in order to retrieve the additional data packets. As the bulk transfer processes continue, the controller 156 can continue to inform the host system 110 of any additional data packets received by appending further supplemental counts to the bulk transfer data payloads. This can eliminate the need to set up another interrupt poll until all packets received by the network adapter 150 have been received by the host system 110. The host may be configured to recognize that all packets have been received when all reported packets have been received and the last packet received contained 0 count value.

The supplemental count information can be provided to the host system in a variety of ways. For example, a data block in the bulk transfer data payload may be reserved for the reporting of supplemental count information. The client software 118 (e.g., the network interface adapter) may be configured to receive the supplemental count information, process the information, and then discard the data. In other embodiments, the process for retrieving the supplemental count information from the data payload may vary.

Figure 2:
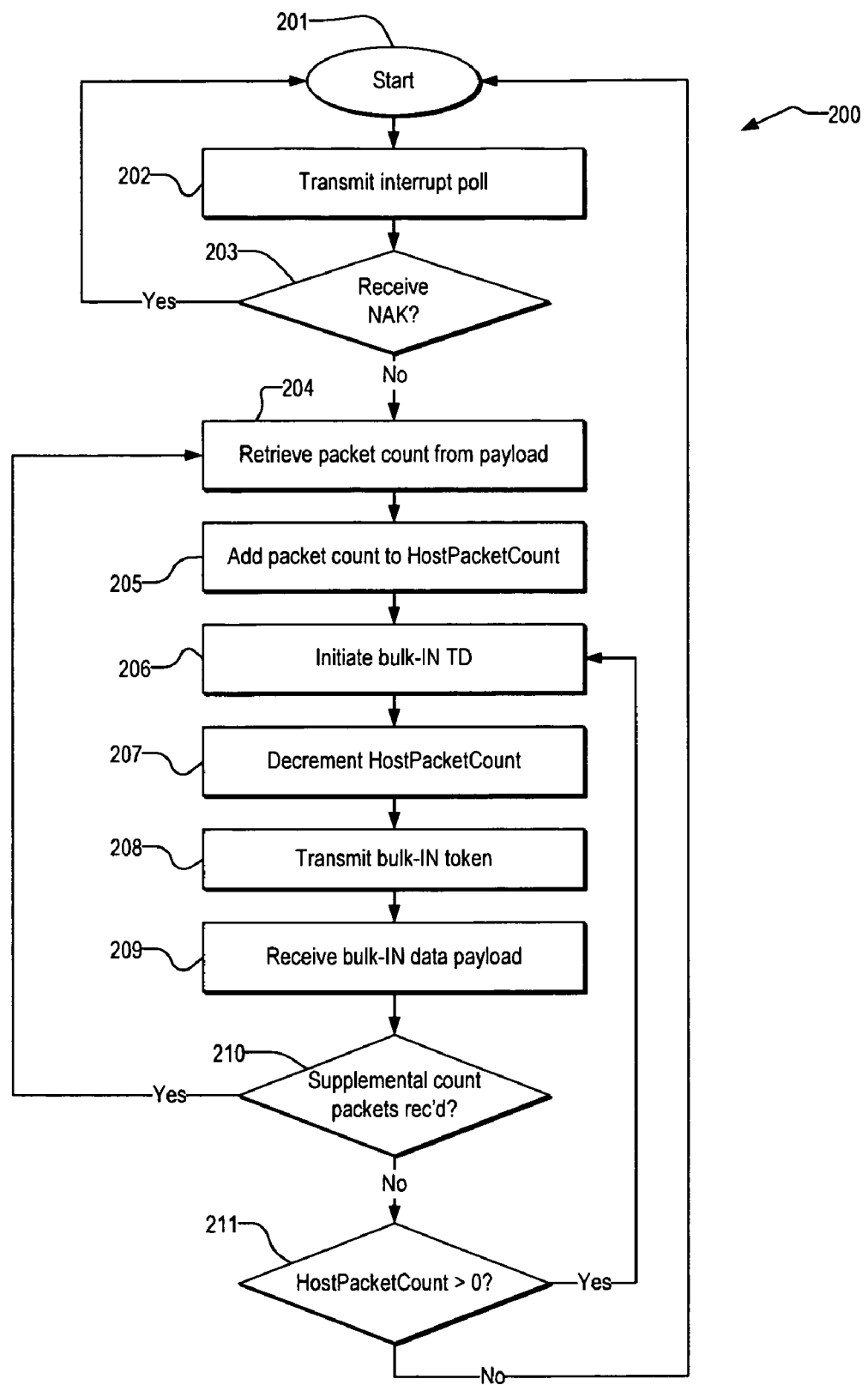
FIG. 2 is a flowchart illustrating a process for receiving data over a USB bus, in accordance with another embodiment of the present invention.

FIG. 2 is a flowchart of a process 200 for receiving data over a USB bus, in accordance with embodiments of the present invention. This method would be implemented by a host system coupled to a network adapter via a USB interface. The process begins at step 201. At step 202, the host system transmits an interrupt poll to the USB function (e.g., the network adapter). In step 203, host system receives a response to the interrupt poll. If the host system receives a NAK response, the process returns to step 201 and another interrupt poll is transmitted according to the predetermined polling frequency. If a data payload is received instead of a NAK response, the host system in step 204 retrieves the packet count from the payload.

The host system may maintain a count of the packets reported by the network adapter, e.g., in a HostPacketCount counter. In step 205, the host system adds the packet count retrieved in step 204 to the HostPacketCount counter. In step 206, the host system initiates one or more bulk-IN transfer descriptors (TD) to begin retrieving the data reported in the payload. In step 207, HostPacketCount is decremented by the number of bulk-IN TDs generated in step 206. In some embodiments, the host system may not have sufficient resources available to immediately schedule all of the TDs necessary to retrieve the number of packets reported by network adapter. In this case, the host system may schedule the bulk-IN TDs one at a time, and decrement the HostPacketCount one at a time as well.

In step 208, the host system transmits a bulk-IN token to the network adapter. In step 209, the host system receives the bulk-IN payload containing the data received by the network adapter. In step 210, the host system checks whether a supplemental count of data packets has been received from the network adapter. If so, then the process returns to step 204 in which the supplemental packet count is retrieved from the payload. If not, then in step 211, the host system checks whether the HostPacketCount is greater than zero. If the HostPacketCount is greater than zero, then the process returns to step 206 in which one or more additional bulk-IN TDs are generated. If not, then the process returns to step 201 and the next interrupt poll is generated according to the predetermined schedule.

Figure 3A:
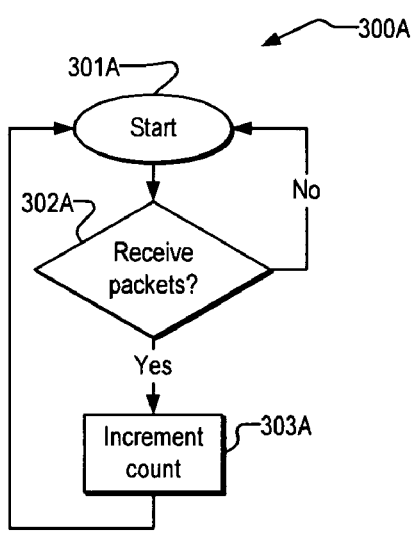
FIGS. 3A-3C are flowcharts of processes for transmitting data over a USB bus, in accordance with embodiments of the present invention.
Figure 3B:
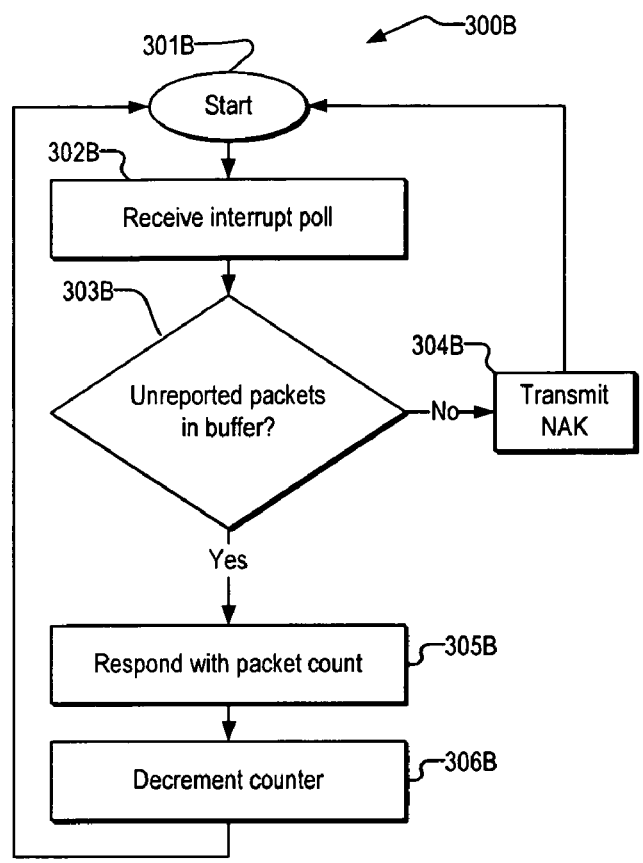
Figure 3C:
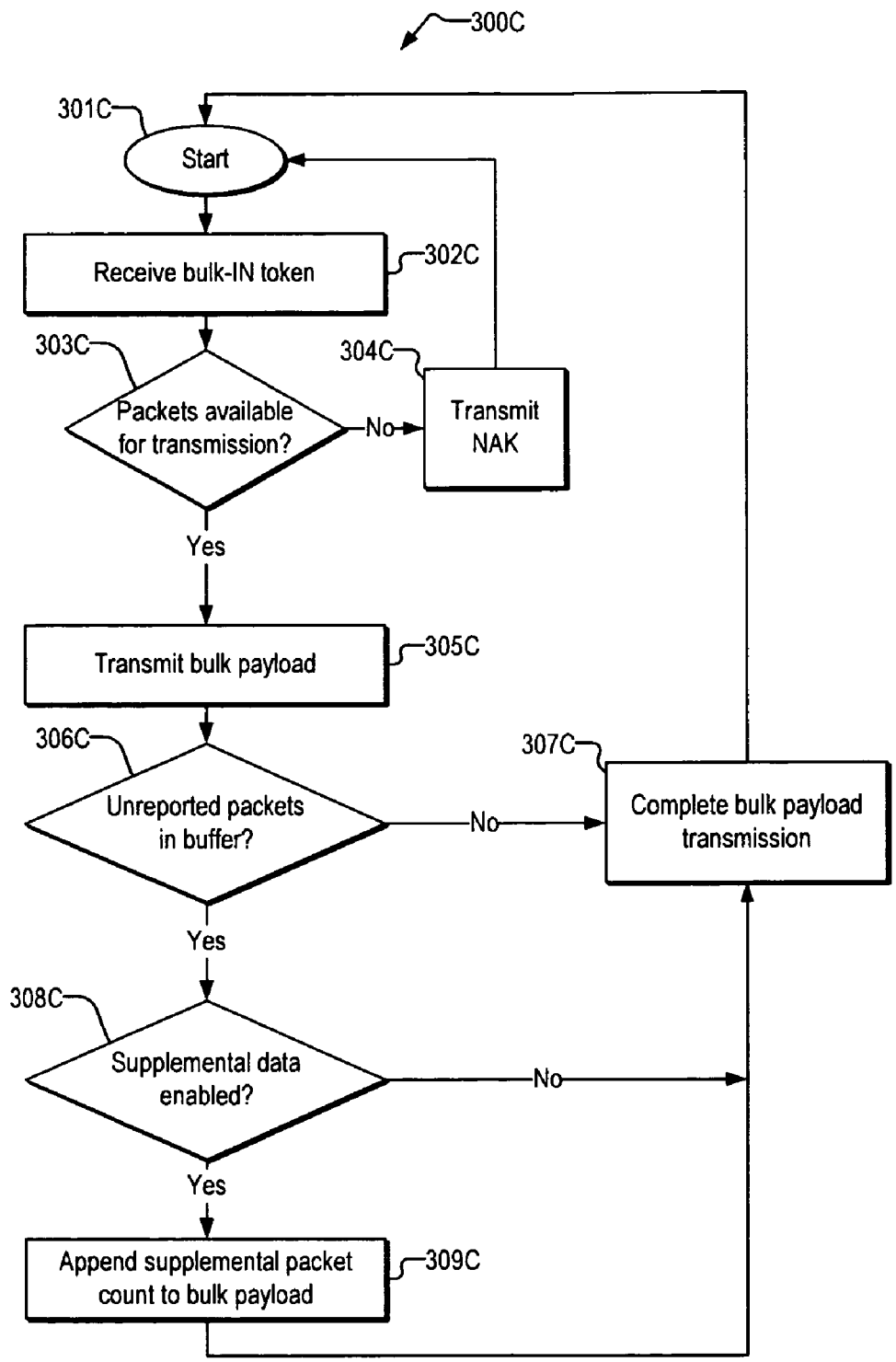

FIGS. 3A-3C are flowcharts of parallel processes 300A-300C for transmitting data over a USB bus, in accordance with embodiments of the present invention. These processes would be implemented by a network adapter coupled to a host system via a USB interface. Process 300A begins at step 301A. At step 302A, if the network adapter receives data packets over the network interface, the packet counter is incremented in step 303A and the process returns to step 301A. If not, the process returns to step 301A. Process 300A is repeatedly performed in parallel with processes 300B-300C by the network adapter during operation.

Process 300B begins at step 301B. In step 302B, the network adapter receives an interrupt poll from the host system. In step 303B, the controller for the network adapter checks whether unreported packets have been received over the network interface and are awaiting transmission to the host system. This determination can be made by checking whether the counter has a non-zero value. If all waiting packets have been reported, the network adapter transmits a NAK handshake response to the host system and the network adapter waits to receive the next interrupt poll.

If unreported packets are awaiting transmission, the network adapter responds to the interrupt poll in step 305B with a data payload including the packet count from the counter. In step 306B, the counter is decremented by the value reported to the host system. This ensures that if the number of unreported packets exceeds the size of the count field in the INT response, no counts are lost.

Process 300C runs in parallel with process 300B and relates to the transmission of data packets. In step 301C, the network adapter receives a bulk-IN token from the host system. In step 302C, the network adapter determines whether packets are available for transmission. Normally, because the host system should only transmit a bulk-IN token after the network adapter has reported that data packets are available for transmission, the process should always proceed to step 305C. However, in the event of an error, for example, if no data packets are available, the network adapter in step 304C will transmit a NAK response to the host system. As long as data is available for transmission, in step 305C, the network adapter transmits a bulk payload containing the packet data received from the network.

In step 306C, the network adapter checks whether additional packets have been received. This can be performed by checking whether the counter has been incremented according to process 300A since the last time the packet count was reported to the host system. If additional packets have been received, then the network adapter checks whether the supplemental data feature has been enabled. If the supplemental data has been enabled, then, the supplemental packet count is appended to the bulk data payload in step 309C, and the process moves to 307C to complete the bulk payload transmission. If not, then in step 306C, the bulk payload transmission is completed. In some embodiments, the supplemental data is always transmitted to the host system. If no new packets have been received, then a supplemental count of 0 is transmitted.

In accordance with various embodiments of the present invention, the counters can be implemented in the USB function in various ways. The size of the counter may vary depending on the type of device. For instance, some devices may contain more than one network interface, with each network interface being provided with its own counter. In this case, the interrupt response payload may not be large enough to include all of the counters. Accordingly, the device may be configured such that the counts reported in the interrupt response do not completely clear the counter, thereby enabling all of the network interfaces to be represented in a single interrupt poll response.

For example, the count for a network interface may be represented in the interrupt poll response using 2 bits. If 8 packets are waiting at that network interface, the device will report a count of 3 data packets (the maximum number reportable using 2 bits) in order to provoke the host system to initiate a bulk data transfer. The counter for that network interface may then be decremented by 3 to a count of 5. The network adapter will then receive a bulk-IN token from the host system and will begin transmitting the packets using the bulk transfer process. In the first bulk transfer process, the network adapter may then report a supplemental count of 5 packets. The host system can then add those 5 packets to the queue of outstanding bulk transfers.

In addition, the size of each packet may vary, depending on the application. The host system can schedule each bulk-IN transfer for the maximum possible size. As long as the packet to be transferred has an actual size equal to or smaller than the maximum packet size, the transferred data will fit into the buffer allotted in the host.

Embodiments of the present invention may provide various advantages not provided by prior art systems. The repeated bulk polling can be eliminated and replaced with interrupt polling, which results in decreased consumption of host USB controller resources and USB link bandwidth. In addition, the reporting of supplemental data packets received during the pending of bulk-IN transfers can reduce the number of interrupt polls generated. This can result in a reduced latency of packet reception when blocks of packets are received.

For example, in one embodiment, the USB interface comprises a USB 1.1 interface and the network interface comprises a 100 Mbps Ethernet interface, which is considerably faster than the USB 1.1 interface. The network interface may receive a single packet, and in response to the next interrupt poll from the host system, the network adapter will transmit an interrupt response reporting that one packet is awaiting delivery. While the network adapter is transmitting the first packet via a bulk-IN transfer process, two additional data packets may be received, since the network interface is faster than the USB interface. Without the use of supplement packet reporting in the bulk-IN data payload, the host system would not be informed of the presence of the additional data packets until the first bulk-IN data transfer process is completed and the next interrupt poll is transmitted. Depending on the configured interrupt poll schedule, this may result in a delay of one millisecond or more. In contrast, by reporting the presence of additional data packets by appending supplemental packet information to the data payload for the first bulk-IN data transfer process, the host system can immediately queue additional bulk-IN data transfer processes to retrieve the additional packets. Thus, the data transfer efficiency can be improved because the interrupt polling of the network adapter is not restarted until the network adapter no longer has any packets to transmit.

Embodiments may enable the reduction of resource utilization, including the buffers and transfer descriptors on the host system. This reduction in resource utilization can be particularly advantageous on low end and/or low power host systems. For example, hand-held, battery powered host systems, such as personal digital assistants (PDAs) and digital cameras, may utilize lower end host controller hardware and may not be provided with extensive resources (e.g. memory). In addition, embodiments may provide improved performance for host systems having multiple network adapters on the same USB bus.

While the invention has been described in terms of particular embodiments and illustrative figures, those of ordinary skill in the art will recognize that the invention is not limited to the embodiments or figures described. For example, the embodiments described above related to the use of interrupt and bulk data transfer processes, as implemented in the USB 1.1 and 2.0 specification. Other embodiments may be implemented in systems using other types of polling buses in which a host controller controls all devices on the bus.

In addition, the slave device need not be limited to an Ethernet adapter. In other embodiments, the slave device may comprise any type of communications device having an irregular packet transfer schedule, such as, e.g., a wireless modem.

In addition, some of the embodiments described above relate to a USB network adapter having a single USB interface for connection with a host PC and a single Ethernet interface for connection with a network. In other embodiments, multiple interfaces may be provided. For example, the USB function may comprise a USB enabled router having multiple network interfaces and multiple USB interfaces.

In many of the embodiments described above, the host system utilizes interrupt polling before initiating bulk data transfers. In other embodiments, the interrupt polling is replaced with conventional bulk polling. Even without the use of interrupt polling, the appending of supplemental packet information to the bulk data payload can reduce the consumption of host resources by allowing a host system to issue a single bulk-IN poll, followed by multiple bulk-IN data transfers when multiple waiting packets are detected via the appended supplemental data. The use of interrupt polling and the information provided by the interrupt polling (e.g., whether the interrupt response provides a precise count of waiting packets or merely an indication that at least one packet is available) may be configurable by the host system.

In yet other embodiments, a control transfer process may be used to poll the USB function. The control transfer polling would operate similarly to the interrupt transfer except that the function does not transmit a NAK response when the contents are 0. Instead, when the counter indicates that zero packets are awaiting delivery, the USB device controller returns a 0 value. The control transfer interrupt can be used to provide a diagnostic tool to the host system to ensure that the host system is synchronized with the USB device. This can enable graceful recovery from software errors where the USB device has reported a packet but the host system has somehow miscounted.

In various embodiments described above, interrupt polling and supplemental data transmissions are used to control the receiving of data at the USB host from a USB function. In accordance other embodiments of the present invention, interrupt polling and supplemental data transmissions may be used for transmitting data from the USB host to a USB function.

For example, a USB function may have a first USB interface for communication with a host and a second interface. The second interface may have a transmission rate much slower than the USB interface, e.g., the first USB interface comprises a USB 2.0 interface having a 480 Mb/s transmission rate and the second interface comprises a 802.11g wireless network interface having a 54 Mb/s transmission rate. When the host has data to transmit to the USB function, the host transmits the packet through the bus to the function using a BULK-OUT data transfer process. If the host has multiple packets to send, the host will attempt to send them all. However, since the USB interface transmits faster than the 802.11g network interface, the buffer memory on the USB function may be filled before receiving all of the pending packets of data. When the buffer is filled, the USB function will transmit to a NAK response to the BULK-OUT data transfer process initiated by the host. The USB function will continue to transmit NAK responses until enough data is transmitted out of the second network interface to make room available in the buffer memory to receive another packet. The slower the second interface is than the first USB interface, the more likely it is that USB bandwidth is wasted with excessive NAK responses caused by a full buffer on the USB function.

Accordingly, it may be desirable to provide a transmit count register from the USB function to the USB host. This transmit count register informs the host how much data (e.g., how many bytes or how many maximum size packets) may be queued in the USB function transmit buffer memory before the function will begin transmitting NAK responses in response to receiving BULK-OUT requests from the host. The host can then limit its packet bursts to that number. Unfortunately, the host may not be able to precisely determine when memory has been made available in the buffer. Even if the host knows the speed of the second network interface and can estimate the time required to empty the buffer, transmissions can be delayed, thereby causing the estimates to be inaccurate. These delays may be caused, e.g., when the channel used for the wireless connection is congested, or when the Ethernet interface is half duplex rather than full duplex.

Accordingly, the host system may transmit an INT poll to the USB function to detect when the host may restart data transfer. When the USB function receives the INT poll, the USB function will respond with an indication of how much space is available in the buffer (e.g., how many packets or bytes can be transmitted). This arrangement may be preferable when the speeds and buffer capacity are engineered such that the INT poll results in an improvement in operation. For example, the transmit memory buffer may be sized such that the time required to transmit all its data is 10 ms. Once the buffer is filled, the host can generate the INT poll every 5 ms. This would ensure that the host keeps the function's transmit memory occupied in a fashion similar to how one manages the serial port FIFO interrupt depths on a modem on a PC.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of transmitting data packets over a data bus having a host system operating as a data bus master and a peripheral system operating as a data bus slave, comprising:
   receiving data packets at the peripheral system;
   transmitting to the host system via a bus interface an initial count of the number of received data packets;
   transmitting to the host system via the bus interface the received data packets via one or more bulk data transfer processes; and
   transmitting via at least one bulk data transfer process a supplemental count of the number of additional data packets received after the step of transmitting of the initial count of the number of received data packets.

2. The method of 1, wherein:
   said data bus comprises a Universal Serial Bus (USB);
   said host system comprises a USB host; and
   said peripheral system comprises a USB function.

3. The method of 1, wherein:
   said transmitting the initial count of the number of received data packets comprises transmitting the initial count of the number of received data packets via an interrupt data transfer process.

4. The method of 3, wherein:
   said transmitting the initial count of the number of received data packets comprises transmitting the initial count of the number of received data packets via the interrupt data transfer process in response to receiving an interrupt token from the USB host.

5. The method of 1, wherein:
   said transmitting the supplemental count of the number of additional data packets comprises transmitting a bulk data packet to the host system, said bulk data packet comprising one or more data packets and the supplemental count of the number of additional data packets.

6. The method of 1, further comprising:
   after transmitting the initial count of the received data packets, decrementing a counter by the initial count value;
   wherein said transmitting the supplemental count of the number of additional data packets received after the step of transmitting of the initial count of the number of received data packets comprises:
   checking whether a current count in the counter is a non-zero value;

transmitting the current count via at least one bulk data transfer process; and
decrementing the counter by the current count value.

7. The method of 1, further comprising:
receiving outbound data packets at the host system for transmission to the peripheral system;
transmitting to the host system via the bus interface an indication of available buffer memory for receiving data packets from the host system; and
transmitting to the peripheral system via the bus interface the outbound data packets via one or more bulk data transfer processes.

8. A peripheral system for communication with a host system over a data bus, wherein said host system operates as a data bus master and the peripheral system operates as a data bus slave, said peripheral system comprising:
a bus interface;
a memory for storing a count of data packets received by the peripheral system; and
a controller configured to:
transmit to the host system via the bus interface an initial count of the number of data packets received via the network interface;
transmit to the host system via the bus interface the received data packets via one or more bulk data transfer processes; and
transmit to the host system via at least one bulk data transfer process a supplemental count of the number of additional data packets received after the step of transmitting of the initial count of the number of received data packets.

9. The system of 8, wherein:
said data bus comprises a Universal Serial Bus (USB);
said host system comprises a USB host; and
said peripheral system comprises a USB function.

10. The system of 8, wherein:
said controller is configured to transmit the initial count of the number of received data packets by transmitting the initial count of the number of received data packets via an interrupt data transfer process.

11. The system of 10, wherein:
said controller is configured to transmit the initial count of the number of received data packets by transmitting the initial count of the number of received data packets via the interrupt data transfer process in response to receiving an interrupt token from the USB host.

12. The system of 8, wherein:
said controller is configured to transmit the supplemental count of the number of additional data packets by transmitting a bulk data packet to the USB host, said bulk data packet comprising one or more data packets and the supplemental count of the number of additional data packets.

13. The system of 8, wherein the controller is further configured to:
decrement a counter by the initial count after transmitting the initial count of the number of received data packets;
transmit the supplemental count of the number of additional data packets received after the step of transmitting of the initial count of the number of received data packets by:
checking whether a current count in the counter is a non-zero value;
transmitting the current count via at least one bulk data transfer process; and
decrementing the counter by the current count value.

14. The system of 8, wherein the controller is further configured to:
transmit to the host system via the bus interface an indication of available buffer memory for receiving outbound data packets from the host system; and
receive via the bus interface the outbound data packets via one or more bulk data transfer processes.

15. A method of communicating over a data bus having a host system operating as a data bus master and a peripheral system operating as a data bus slave, said method comprising:
receiving at the host system an initial count of the number of data packets received by the peripheral system;
initiating a bulk data transfer process between the host system and the peripheral system;
receiving via the bulk data transfer process at least some of the data packets received by the peripheral system; and
receiving via the bulk data transfer process a supplemental count of the number of additional data packets received after the step of transmitting of the initial count of the number of received data packets.

16. The method of 15, wherein:
said data packets received at the peripheral system comprises data packets received over a network interface of the peripheral system.

17. The method of 15, wherein:
said data bus comprises a Universal Serial Bus (USB);
said host system comprises a USB host; and
said peripheral system comprises a USB function.

18. The method of 17, further comprising:
initiating a supplemental bulk data transfer process;
receiving the additional data packets via the supplemental bulk data transfer process.

19. The method of 17, wherein said receiving the initial count of the number of received data packets comprises:
receiving the initial count of the number of received data packets via an interrupt data transfer process.

20. The method of 19, further comprising:
transmitting an interrupt token to the USB device;
wherein said receiving the initial count of the number of received data packets comprises receiving the initial count of the number of received data packets via the interrupt data transfer process in response to said transmitting of the interrupt token.

21. The method of 17, wherein said receiving the supplemental count of the number of additional data packets comprises:
receiving a bulk data packet from the USB device via the bulk data transfer channel, said bulk data packet comprising data packets and the supplemental count of the number of additional data packets.

22. A host system for communicating with a peripheral system over a data bus, wherein the host system operates as a data bus master and the peripheral system operates as a data bus slave, said host system comprising:
a bus interface for receiving data packets from the peripheral system; and
a host controller configured to
receive an initial count of the number of data packets received by the peripheral system;
initiate a bulk data transfer process between the host system and the peripheral system;
receive via the bulk data transfer process at least some of the data packets received by the peripheral system; and
receive via the bulk data transfer process a supplemental count of the number of additional data packets received after the step of transmitting of the initial count of the number of received data packets.

23. The system of 22, wherein:
said data packets received at the peripheral system comprises data packets received over a network interface of the peripheral system.

24. The system of 22, wherein:
said data bus comprises a Universal Serial Bus (USB);
said host system comprises a USB host; and
said peripheral system comprises a USB function.

25. The system of 22, said host controller is further configured to:
initiate a supplemental bulk data transfer process;
receive the additional data packets via the supplemental bulk data transfer process.

26. The system of 22, wherein:
said host controller is configured to receive the initial count of the number of received data packets by receiving the initial count of the number of received data packets via an interrupt data transfer process.

27. The system of 26, wherein said host controller is further configured to:
transmit an interrupt token to the USB device; and
receive the initial count of the number of received data packets by receiving the initial count of the number of received data packets via the interrupt data transfer process in response to said transmitting of the interrupt token.

28. The system of 22, wherein said host controller is configured to receive the supplemental count of the number of additional data packets by:
receiving a bulk data packet from the USB device via the bulk data transfer channel, said bulk data packet comprising data packets and the supplemental count of the number of additional data packets.

29. A host system for communicating with a peripheral system over a data bus, wherein the host system operates as a data bus master and the peripheral system operates as a data bus slave, said host system comprising:
means for receiving an initial count of data packets received by a USB device;
means for initiating a bulk data transfer process between the USB host and the USB device;
means for receiving via the bulk data transfer process at least some of the data packets received by the USB device; and
means for receiving via the bulk data transfer process a supplemental count of the number of additional data packets received after the step of transmitting of the initial count of the number of received data packets.

30. A peripheral system for communication with a host system over a data bus, wherein said host system operates as a data bus master and the peripheral system operates as a data bus slave, said peripheral system comprising:
a bus interface;
a memory for storing a count of data packets received by the peripheral system; and
means for transmitting to the host system via the bus interface an initial count of data packets received via the network interface;
means for transmitting to the host system via the bus interface the received data packets via one or more bulk data transfer processes; and
means transmitting to the host system via at least one bulk data transfer process a supplemental count of the number of additional data packets received after the step of transmitting of the initial count of the number of received data packets.

* * * * *